United States Patent
Roy Thill

(10) Patent No.: US 10,662,797 B2
(45) Date of Patent: May 26, 2020

(54) MULTI-PLANE BRUSH SEAL

(71) Applicant: United Technologies Corporation, Farmington, CT (US)

(72) Inventor: Carson A. Roy Thill, South Berwick, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 119 days.

(21) Appl. No.: 15/946,143

(22) Filed: Apr. 5, 2018

(65) Prior Publication Data
US 2019/0309642 A1 Oct. 10, 2019

(51) Int. Cl.
| F01D 11/00 | (2006.01) |
| F01D 11/02 | (2006.01) |
| F02K 3/06 | (2006.01) |
| F16J 15/3288 | (2016.01) |

(52) U.S. Cl.
CPC ............ F01D 11/02 (2013.01); F02K 3/06 (2013.01); F16J 15/3288 (2013.01)

(58) Field of Classification Search
CPC .. F01D 11/001; F16J 15/3288; F05D 2240/56
See application file for complete search history.

(56) References Cited

U.S. PATENT DOCUMENTS

| 5,174,582 A | 12/1992 | Ferguson |
| 5,335,920 A | 8/1994 | Tseng et al. |
| 5,498,139 A | 3/1996 | Williams |
| 5,975,535 A | 11/1999 | Gail et al. |
| 6,173,958 B1 | 1/2001 | Dinc et al. |
| 6,293,554 B1 | 9/2001 | Dinc et al. |
| 6,352,263 B1 | 3/2002 | Gail et al. |
| 6,457,719 B1 | 10/2002 | Fellenstein et al. |
| 6,808,180 B2 | 10/2004 | Shore |
| 9,587,505 B2 | 3/2017 | Mukhopadhyay et al. |

(Continued)

FOREIGN PATENT DOCUMENTS

| EP | 0214192 A1 | 3/1987 |
| WO | WO8605252 A1 | 9/1986 |

(Continued)

OTHER PUBLICATIONS

EP search report for EP19155536.6 dated Jul. 23, 2019.

*Primary Examiner* — Ninh H. Nguyen
(74) *Attorney, Agent, or Firm* — Getz Balich LLC

(57) ABSTRACT

A multi-plane annular brush seal includes a front plate, a back plate, and a plurality of bristles. Each of the plurality of bristles has a first lengthwise portion extending from the base end, a second lengthwise portion, and a third lengthwise portion. The front plate and back plate are configured to maintain the bristle first lengthwise portions substantially parallel to a first plane, the second lengthwise portion of the bristles through a transition region, and the bristle third lengthwise portions substantially parallel to a second plane. The first plane is skewed from the second plane by an obtuse angle. At least some of the bristle second lengthwise portions are maintained in contact with the front plate through the transition region and at least some of the bristle second lengthwise portions are maintained in contact with the back plate through the transition region.

18 Claims, 6 Drawing Sheets

(56) References Cited

U.S. PATENT DOCUMENTS

| | | | |
|---|---|---|---|
| 2002/0189096 A1* | 12/2002 | Flower | F16J 15/3268 29/888.3 |
| 2009/0072486 A1* | 3/2009 | Datta | F16J 15/3288 277/355 |
| 2012/0251303 A1* | 10/2012 | Zheng | F01D 11/001 415/173.3 |
| 2015/0198251 A1 | 7/2015 | Beichl et al. | |
| 2016/0061330 A1 | 3/2016 | Davis | |
| 2017/0089215 A1 | 3/2017 | Zheng et al. | |
| 2018/0058241 A1* | 3/2018 | Sarawate | F01D 5/02 |
| 2019/0024801 A1 | 1/2019 | Davis et al. | |

FOREIGN PATENT DOCUMENTS

| | | |
|---|---|---|
| WO | WO03091609 A1 | 3/1987 |
| WO | 03091609 A1 | 11/2003 |

\* cited by examiner

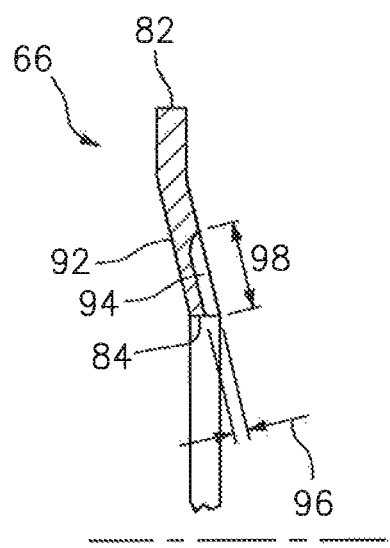
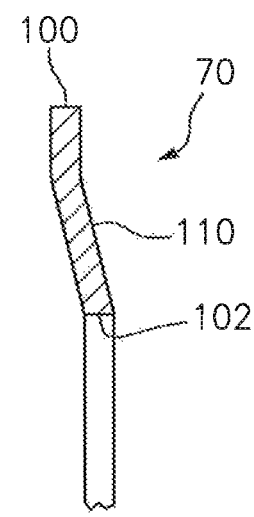
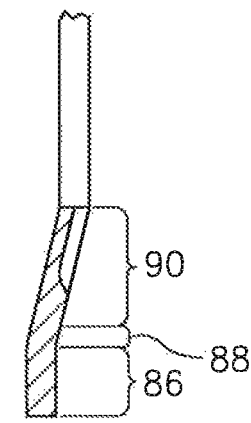
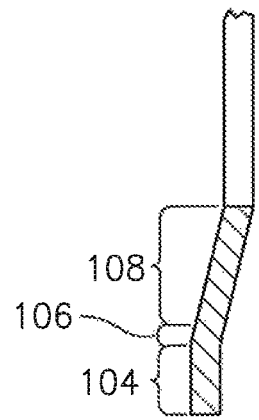
*FIG. 5*   *FIG. 6*
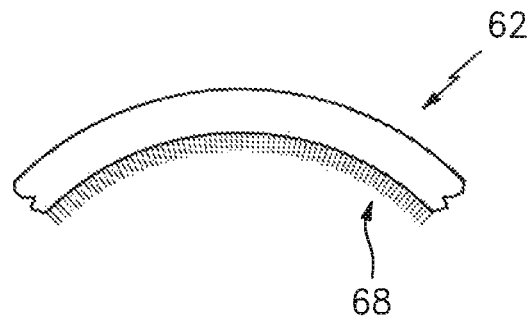
*FIG. 7*

MULTI-PLANE BRUSH SEAL

This invention was made with Government support under W58RGZ-16-C-0046 awarded by the United States Army. The Government has certain rights in this invention.

BACKGROUND

1. Technical Field

This disclosure relates generally to fluid seals for turbine engines in general, and to brush seals in particular.

2. Background Information

Rotary machines such as turbine engines and compressors typically include a path through which a core gas (or other fluid) travels. Energy is introduced into the core gas, typically increasing the temperature and pressure of the core gas. Leakage from a high pressure region to a low pressure region is generally undesirable. Brush seals having a plurality of bristles sandwiched between a face plate and a back plate may be used to prevent or inhibit fluid flow from a high pressure region to a low pressure region. Typically, brush seals are deployed to seal a gap between a pair of static members, or between a static member and a dynamic member, and to seal between a high pressure region and a low pressure region. The brush seal is typically positioned so that the bristles extend across the gap between the members, with the free end of the bristles disposed adjacent a sealing surface of one of the members. In those applications where a brush seal is utilized to provide a seal relative to a rotating member, the bristles may be circumferentially canted at an angle in the direction of rotation of the rotating member. Brush seals are designed to accommodate some transient movement of the sealing surface relative to the bristles. In some applications, the brush seal may be subject to turbulent air flow, which can cause the bristles to at least temporarily migrate out of position (e.g., flutter) and detrimentally affect their ability to seal. In some applications, the difference in pressure across the seal (i.e., the difference in pressure between the high pressure region and the low pressure region) can also cause the bristles to deflect and negatively affect their ability to seal. PCT Publication No. WO 03/091609 and European Patent No. 0214192 each describe examples of brush seals that are currently known. What is needed is a brush seal that can adequately seal in a relatively high pressure difference environment and/or one that can withstand a relatively high turbulent air environment and still adequately seal.

SUMMARY OF THE DISCLOSURE

According to a first aspect of the present disclosure, a multi-plane annular brush seal that extends circumferentially about an axial centerline is provided. The brush seal includes a front plate, a back plate, and a plurality of bristles. The plurality of bristles are attached to the front plate and the back plate at a base end of the brush seal. Each bristle has a first lengthwise portion extending from the base end, a second lengthwise portion, and a third lengthwise portion. The second lengthwise portion of each respective bristle is disposed between the first lengthwise portion and third lengthwise portion of the respective bristle. Each third lengthwise portion terminates in a tip end. The front plate and back plate are configured to maintain the bristle first lengthwise portions substantially parallel to a first plane, to maintain the second lengthwise portion of the bristles through a transition region, and to maintain the bristle third lengthwise portions substantially parallel to a second plane. The first plane is skewed from the second plane by an obtuse angle. At least some of the bristle second lengthwise portions are maintained in contact with the front plate through the transition region and at least some of the bristle second lengthwise portions are maintained in contact with the back plate through the transition region.

In any of the aspects or embodiments described above and herein, the front plate and the back plate may be configured to maintain the bristle first lengthwise portions substantially parallel to the first plane, to maintain the second lengthwise portion of the bristles through the transition region, and to maintain the bristle third lengthwise portions substantially parallel to the second plane, at any given circumferential position of the brush seal.

In any of the aspects or embodiments described above and herein, the transition region may be arcuately shaped.

In any of the aspects or embodiments described above and herein, the front plate ("FP") may include a first FP inner side surface disposed adjacent the bristle first lengthwise portions, an FP transition surface disposed adjacent the bristle second lengthwise portions, and a second FP inner side surface disposed adjacent the bristle third lengthwise portions.

In any of the aspects or embodiments described above and herein, the first FP inner side surface may be skewed from the second FP inner side surface by an angle substantially equal to the obtuse angle.

In any of the aspects or embodiments described above and herein, the front plate may include a relief pocket disposed in the second FP inner side surface and is open to an FP tip end.

In any of the aspects or embodiments described above and herein, at least some of the bristle first lengthwise portions may be in contact with the first FP inner side surface, and at least some of the bristle third lengthwise portions may be in contact with the second FP inner side surface.

In any of the aspects or embodiments described above and herein, the back plate ("BP") may include a first BP inner side surface disposed adjacent the bristle first lengthwise portions, a BP transition surface disposed adjacent the bristle second lengthwise portions, and a second BP inner side surface disposed adjacent the bristle third lengthwise portions.

In any of the aspects or embodiments described above and herein, the first BP inner side surface may be skewed from the second BP inner side surface by an angle substantially equal to the obtuse angle.

In any of the aspects or embodiments described above and herein, the first FP inner side surface may be substantially parallel to the first BP inner side surface.

In any of the aspects or embodiments described above and herein, the second FP inner side surface may be substantially parallel to the second BP inner side surface.

In any of the aspects or embodiments described above and herein, at least some of the bristle first lengthwise portions may be in contact with the first BP inner side surface, and at least some of the bristle third lengthwise portions may be in contact with the second BP inner side surface.

In any of the aspects or embodiments described above and herein, the bristle third lengthwise portions extend beyond an FP tip end and beyond a BP tip end.

In any of the aspects or embodiments described above and herein, the bristle third lengthwise portions extend a first distance beyond the FP tip end, and extend a second distance beyond the BP tip end, wherein the first distance and the second distance are equal.

According to another aspect of the present disclosure, an annular brush seal that extends circumferentially about an axial centerline is provided. The brush seal includes a front plate, a back plate, and a plurality of bristles. The front plate has a FP base end, a FP tip end, a first FP inner side surface, and a second FP inner side surface. The first FP inner side surface extends from the FP base end to the second FP inner side surface. The first FP inner side surface is planar and extends along a first line, and the second FP inner side surface is planar and extends along a second line, and the first line and the second line are skewed from one another by an included obtuse angle. The back plate has a BP base end, a BP tip end, a first BP inner side surface, and a second BP inner side surface. The first BP inner side surface extends from the BP base end to the second BP inner side surface. The first BP inner side surface is substantially parallel the first FP inner side surface, and the second BP inner side surface is substantially parallel the second FP inner side surface. The plurality of bristles are attached to the front plate and the back plate adjacent the FP base end and the BP base end.

In any of the aspects or embodiments described above and herein, each bristle within the plurality of bristles has a first lengthwise portion extending from a base end, a second lengthwise portion, and a third lengthwise portion, and the second lengthwise portion of each respective bristle is disposed between the first lengthwise portion and third lengthwise portion of the respective bristle, and each third lengthwise portion terminates in a tip end.

In any of the aspects or embodiments described above and herein, the bristle first lengthwise portions extend substantially parallel to the first FP inner side surface, and the bristle third lengthwise portions extend substantially parallel to the second FP inner side surface.

In any of the aspects or embodiments described above and herein, the second lengthwise portion of each respective bristle, the bristle arcuately transitions from the first lengthwise portion to the third lengthwise portion.

In any of the aspects or embodiments described above and herein, the front plate may include a relief pocket disposed in the second FP inner side surface and is open to the FP tip end.

According to another aspect, a gas turbine engine is provided. The gas turbine engine includes a fan section, a compressor section, a combustor section, a turbine section, and at least one multi-plane brush seal that extends circumferentially about an axial centerline. The brush seal includes a front plate, a back plate, and a plurality of bristles. The plurality of bristles are attached to the front plate and the back plate at a base end of the brush seal. Each bristle has a first lengthwise portion extending from the base end, a second lengthwise portion, and a third lengthwise portion. The second lengthwise portion of each respective bristle is disposed between the first lengthwise portion and third lengthwise portion of the respective bristle, and each third lengthwise portion terminates in a tip end. The front plate and back plate are configured to maintain the bristle first lengthwise portions substantially parallel to a first plane, to maintain the second lengthwise portion of the bristles through a transition region, and to maintain the bristle third lengthwise portions substantially parallel to a second plane. The first plane is skewed from the second plane by an obtuse angle. At least some of the bristle second lengthwise portions are maintained in contact with the front plate through the transition region and at least some of the bristle second lengthwise portions are maintained in contact with the back plate through the transition region.

The foregoing features and the operation of the present disclosure will become more apparent in light of the following description and the accompanying drawings.

BRIEF DESCRIPTION OF THE DRAWINGS

FIG. 5 is a diagrammatic sectioned side view of a front plate element of a brush seal embodiment.

FIG. 6 is a diagrammatic sectioned side view of a back plate element of a brush seal embodiment.

FIG. 7 is a diagram planar partial view of a brush seal embodiment showing bristles in a radial orientation.

DETAILED DESCRIPTION

Figure 1:
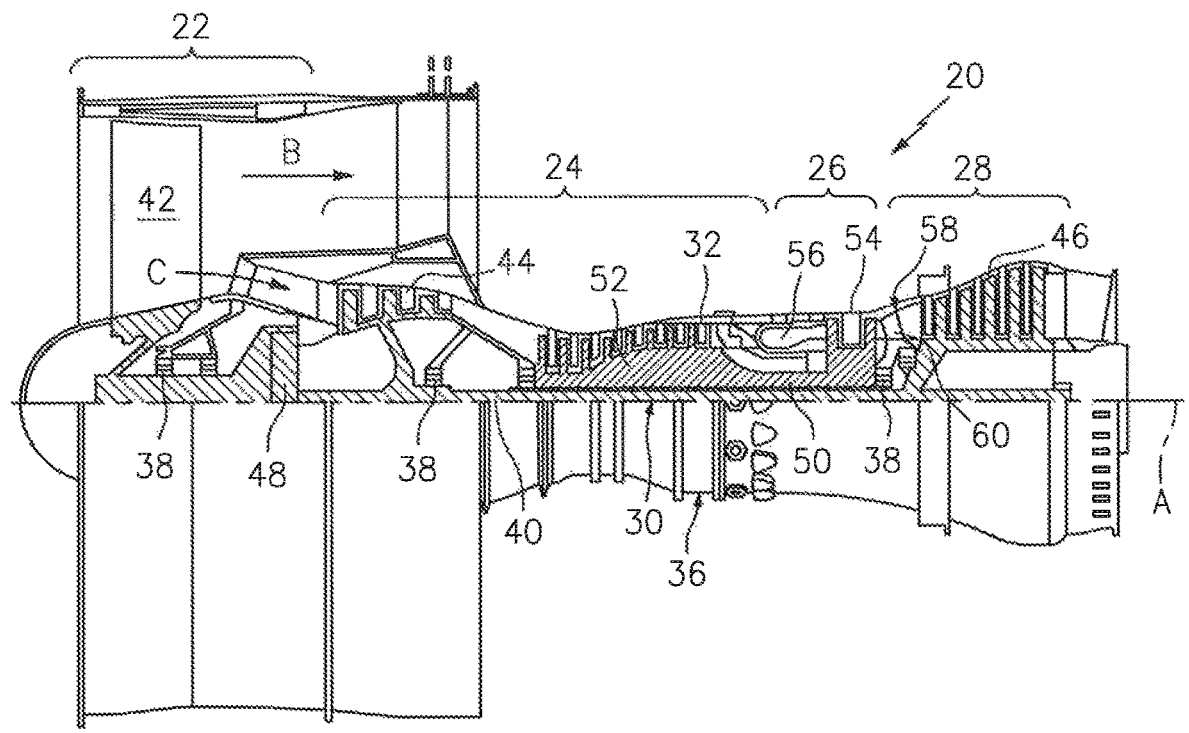
FIG. 1 is a diagrammatic partially sectioned view of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

To facilitate the description of the present disclosure a two-spool turbofan type gas turbine engine 20 is shown (e.g., see FIG. 1). This exemplary embodiment of a gas turbine engine includes a fan section 22, a compressor section 24, a combustor section 26, and a turbine section 28. The fan section 22 drives air along a bypass flow path B in a bypass duct, while the compressor section 24 drives air along a core flow path C for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of turbine engines; e.g., three-spool architectures.

The exemplary engine 20 shown in FIG. 1 includes a low speed spool 30 and a high speed spool 32 mounted for rotation about an engine central longitudinal axis A relative to an engine static structure 36 via several bearing systems 38. It should be understood that the location, number, and characteristics of bearing systems 38 may vary to suit the particular application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 diagrammatically depicted in FIG. 1 is one example of a high-bypass geared aircraft engine. In other examples, the gas turbine engine 20 may have a bypass ratio that is greater than about six (6), with an example embodiment being greater than about ten (10), the geared architecture 48 may be an epicyclic gear train, such as a planetary gear system or other gear system, with a gear reduction ratio of greater than about 2.3 and the low pressure turbine 46 may have a pressure ratio that is greater than about five (5:1). In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one or more embodiments of a geared architecture engine and that the present disclosure is applicable to other gas turbine engines including direct drive turbofans.

Figure 2:
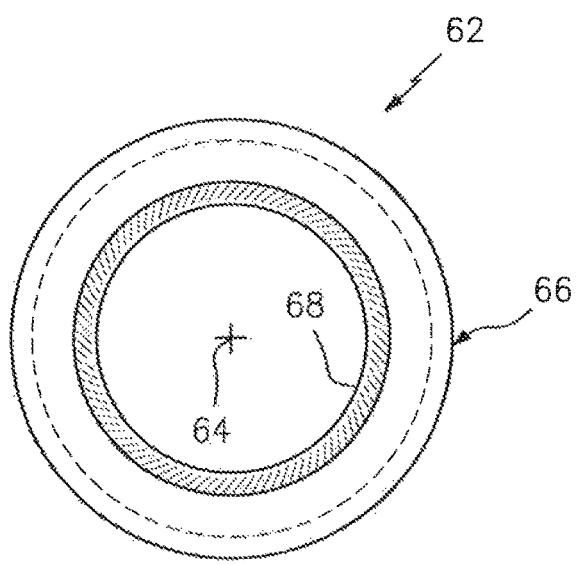
FIG. 2 is a diagrammatic planar view of a brush seal embodiment.
Figure 3:
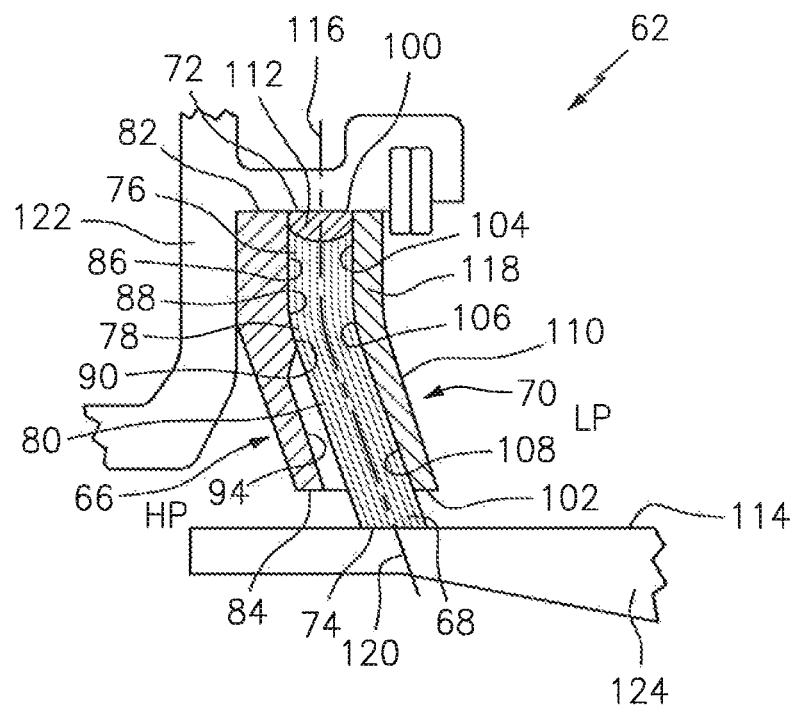
FIG. 3 is a sectioned partial view of a brush seal embodiment mounted on a static element, disposed to seal relative to a dynamic rotating member.

Now referring to FIGS. 2 and 3, according to an aspect of the present disclosure, a brush seal 62 is provided configured to provide a fluid seal between a high pressure region ("HP") and a low pressure region ("LP") as may be present within a gas turbine engine as described above, but is not limited to such an application.

In the embodiment shown in FIGS. 2 and 3, the brush seal 62 is a multi-plane brush seal 62 having an annular configuration that extends continuously around a circumference, and is centered about an axial centerline 64. The brush seal 62 may be a unitary annular element or it may be an annular assembly formed from a plurality of segments. The brush seal 62 includes a front plate 66 ("FP"), a plurality of bristles 68, and a back plate 70 ("BP"). The brush seal embodiment shown in FIGS. 2 and 3 may be described as a "single stage" brush seal; i.e., a single stage of bristles. The present disclosure is not limited to single stage brush seals and may be implemented in a multi-stage brush seal format as shown in FIG. 9A.

Figure 4:
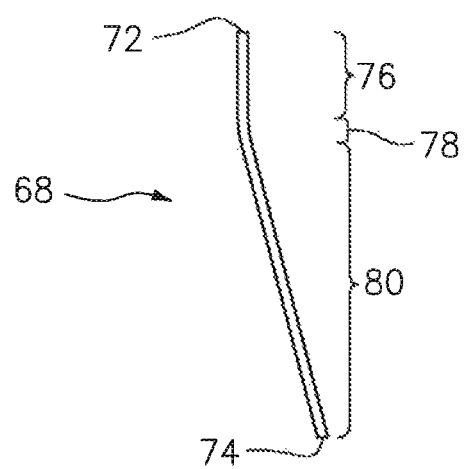
FIG. 4 is a diagrammatic view of a bristle embodiment.

Referring to FIGS. 3 and 4, the plurality of bristles 68 includes a sufficient number of individual bristles 68 to form a body of bristles that extends around the circumference of the brush seal 62. The present disclosure is not limited to any particular individual bristle geometric configuration. In some embodiments, all of the bristles 68 may have the same geometric configuration; e.g., a constant diameter cylindrical geometry, same length etc. In some embodiments, some of the bristles 68 may have a first geometric configuration (e.g., a first diameter, a first length, etc.), and other bristles 68 may have a second geometric configuration (e.g., a second diameter, different than the first diameter, a second length different from the first length, etc.). Each of the plurality of bristles 68 (e.g., see FIG. 4) is a unitary body that extends lengthwise between a distal end 72 and an opposite tip end 74. Each of the bristles 68 may be described as having a first lengthwise portion 76 (extending from the distal end 72), a second lengthwise portion 78, and a third lengthwise portion 80 (extending to the tip end 74). The second lengthwise portion 78 of each bristle 68 is disposed between the first lengthwise portion 76 and third lengthwise portion 80. The present disclosure is not limited to any particular bristle material. Non-limiting examples of acceptable bristle materials include metal alloys such as stainless steel or bronze wire, or synthetic fibers such as of Kevlar, etc.

In the embodiment shown in FIG. 5, the front plate 66 has a FP base end 82, a FP tip end 84, a first FP inner side surface 86, an FP inner side transition surface 88, a second FP inner side surface 90, and an FP outer surface 92. The first FP inner side surface 86 extends between the FP base end 82 and the FP inner side transition surface 88. In some embodiments (e.g., embodiments with no relief pocket 94 as described below), the second FP inner side surface 90 extends from the FP inner side transition surface 88 to the FP tip end 84. The FP outer surface 92 extends from the FP base end 82 to the FP tip end 84. At any given circumferential position of the brush seal 62, the first FP inner side surface 86 and the second FP inner side surface 90 are oriented at an angle relative to one another as will be described below. The FP inner side transition surface 88 is the surface portion that transitions (e.g., arcuately) from the first FP inner side surface 86 to the second FP inner side surface 90.

In some embodiments, a relief pocket 94 is disposed in the second FP inner side surface 90, extending inwardly from, and open to, the FP tip end 84. The relief pocket 94 extends continuously around the circumference of the brush seal 62, and may be described as having a depth 96 and a length 98. The present disclosure is not limited to any particular relief pocket 94 geometry.

In the embodiment shown in FIG. 6, the back plate 70 has a BP base end 100, a BP tip end 102, a first BP inner side surface 104, a BP inner side transition surface 106, a second BP inner side surface 108, and a BP outer surface 110. The first BP inner side surface 104 extends between the BP base end 100 and the BP inner side transition surface 106. The second BP inner side surface 108 extends from the BP inner side transition surface 106 to the BP tip end 102. The BP outer surface 110 extends from the BP base end 100 to the BP tip end 102. At any given circumferential position of the brush seal 62, the first BP inner side surface 104 and the second BP inner side surface 108 are oriented at an angle relative to one another as will be described below. The BP inner side transition surface 106 is the surface portion that transitions (e.g., arcuately) from the first BP inner side surface 104 to the second BP inner side surface 108.

The plurality of bristles 68 are disposed between the front plate 66 and the back plate 70, and are attached to both the front plate 66 and back plate 70 adjacent the distal ends 72 of the bristles 68. In the embodiment shown in FIG. 3, the bristles 68, front plate 66, and back plate 70 are joined to one another by a bead of welding 112 that extends around the circumference of the brush seal 62. The present brush seal 62 is not limited to attachment via welding; e.g., alternative attachment mechanisms include brazing, bonding, soldering, adhesives, etc.

The plurality of bristles 68 extend beyond the tip ends 84, 102 of the front plate 66 and the back plate 70; i.e., a length of the third lengthwise portion 80 of each bristle 68 extends beyond the tip ends 84, 102 of the front plate 66 and the back plate 70. In the embodiment shown in FIG. 3, the tip ends 84, 102 of the front plate 66 and the back plate 70 are disposed at approximately the same position; e.g., disposed at about the same radial position, or stated differently at about the same distance from the sealing surface 114. The present disclosure is not, however, limited to brush seal 62 embodiments having front and back plate tip ends 84, 102 disposed at approximately the same radial position. In some applications, fluids within the operating environment of the brush seal 62 can act on the bristles 68 (i.e., fluid forces sometimes referred to as "windage", often present in high speed rotating shaft applications), causing them to deflect and negatively affect the functionality of the brush seal 62. Embodiments of the present disclosure that include a front plate 66 and a back plate 70 with tip ends 84, 102 disposed at about the same radial position can provide windage protection to the bristles 68. In those brush seal 62 embodiments wherein a relief pocket 94 is disposed in the front plate 66, the front plate 66 still provides windage protection, but also allows some amount of axial deflection of the bristles 68.

Figure 8:
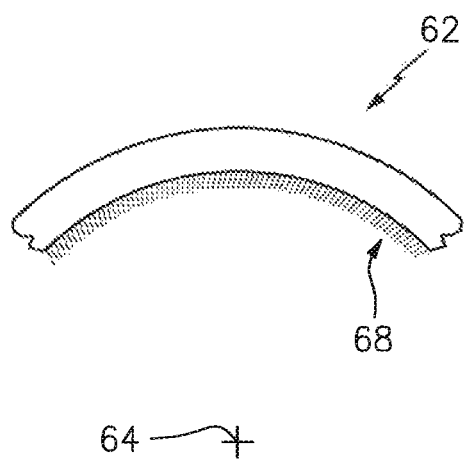
FIG. 8 is a diagram planar partial view of a brush seal embodiment showing bristles in an angled orientation.

In some embodiments, the plurality of bristles 68 may be disposed to lie in a radial plane; e.g., front the viewpoint of FIG. 7 where the axial centerline 64 is perpendicular to the plane of the page, the bristles radially extend relative to the centerline 64. In some embodiments, the plurality of bristles 68 may be disposed to extend beyond the front and rear plates at a non-perpendicular orientation (e.g., an acute angle) relative to the sealing surface; e.g., from the viewpoint of FIG. 8 where the axial centerline 64 is perpendicular to the plane of the page, the bristles extend at an acute angle to a radial line extending out from the centerline 64.

Figure 9:
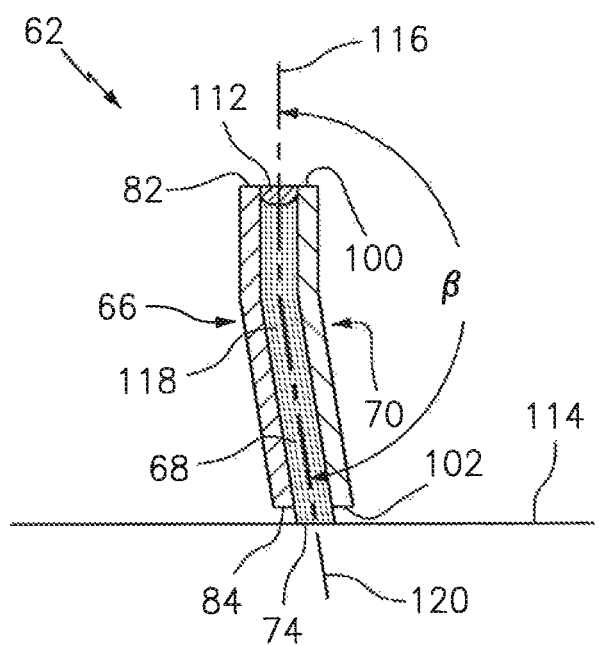
FIG. 9 is a sectioned partial view of a brush seal embodiment.
Figure 9A:
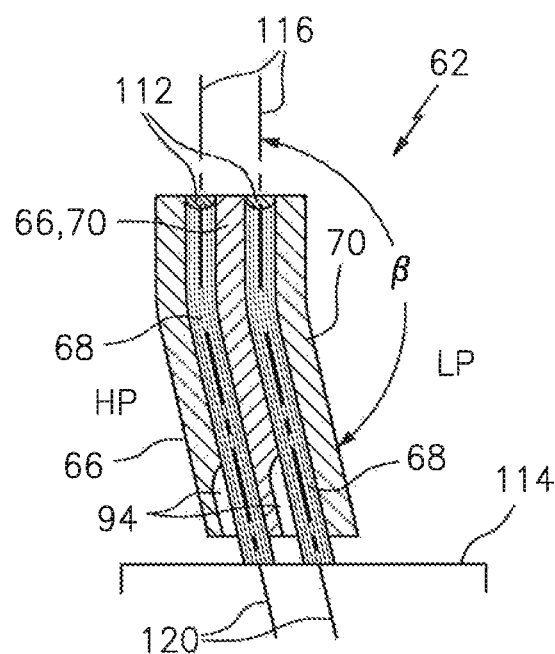
FIG. 9A is a sectioned partial view of a multi-stage brush seal embodiment.
Figure 9B:
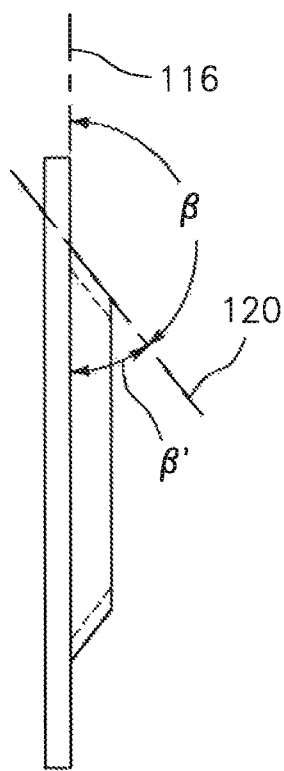
FIG. 9B is a diagram illustrating the angles disposed between the first plane and the second plane.

FIG. 9 is a diagrammatic cross-sectional partial view of an embodiment of the present brush seal 62, which cross-section is taken along a plane that extends through the axial centerline 64 of the brush seal 62. At any given circumferential position of the brush seal 62, the front plate 66 and back plate 70 are configured to maintain the bristle first lengthwise portions 76 substantially parallel to a first plane 116, to maintain the second lengthwise portion 78 of the bristles 68 through a transition region 118 (e.g., an arcuate transition region), and to maintain at least a length of the bristle third lengthwise portions 80 substantially parallel to a second plane 120. The first plane 116 and second plane 120 are skewed front one another by an obtuse angle "β". The range of obtuse angles currently believed to provide adequate sealing performance is about 175 to 135 degrees (175°-135°). FIG. 9B diagrammatically shows the first plane 116 skewed from the second plane 120 by the obtuse angle β, and also shows the supplementary angle β'(i.e., β range about 175°-135°, and the β' range about 5°-45°). An obtuse angle β of about 160° is believed to provide advantageous sealing performance. In the embodiment shown in FIG. 9, the bristle first lengthwise portions 76, the first FP inner side surface 86, and the first BP inner side surface 104 all extend at the given circumferential position in a direction substantially parallel to the first plane 116. Also in the embodiment shown in FIG. 9, the bristle third lengthwise portions 80, at least a portion of the second FP inner side surface 90, and the second BP inner side surface 108 all extend at the given circumferential position in a direction substantially parallel to the second plane 120.

At least some of the bristles 68 are maintained in contact with the first FP inner side surface 86, the FP inner side transition surface 88, and at least a portion of the second FP inner side surface 90. Similarly, at least some of the bristles 68 are maintained in contact with the first BP inner side surface 104, the BP inner side transition surface 106, and at least a portion of the second BP inner side surface 108. The bristle first and second lengthwise portions 76, 78, and at least a length of the third lengthwise portions 80 are, therefore, disposed between and positionally maintained by the inner surfaces 86, 88, 90, 104, 106, 108 of the front and back plates 66, 70; e.g., along the first plane 116, through the transition region 118, and along the second plane 120.

In the brush seal 62 embodiment shown in FIG. 9, the first plane 116 is substantially perpendicular to the axial centerline 64 of the brush seal 62. As indicated above, the second plane 120 is skewed from the first plane 116 by an obtuse angle "β". As a result, in the embodiment shown in FIG. 9 the portion of the brush seal 62 extending along the second plane 120 (i.e., at least a portion of the second FP inner side surface 90, at least a length of the third lengthwise portions 80 of the bristles 68, and the second BP inner side surface 108) forms a truncated cone shape. FIG. 9B diagrammatically illustrates the relationship between the first plane 116 and the second plane 120. In this diagram, the first plane 116 extends perpendicularly out of the page, the second plane 120 extends perpendicularly out of the page (i.e., it is tangential to the truncated cone shape at the given circumferential position), and the first and second planes 116, 120 are skewed from one another by the obtuse angle "β".

The first plane 116 need not, however, be substantially perpendicular to the axial centerline 64; e.g., the first FP inner side surface 86, the bristle first lengthwise portions 76, and the first BP inner side surface 104 may be oriented to be non-perpendicular to the axial centerline 64 of the brush seal 62. In these embodiments, the first FP inner side surface 86, the bristle first lengthwise portions 76, and the first BP inner side surface 104 are parallel one another, but collectively form a truncated cone shape. In similar manner as described above using the diagram of FIG. 9B, at any given circumferential position of the brush seal 62 the first and second planes 116, 120 are skewed from one another by the obtuse angle "β".

Figure 10:
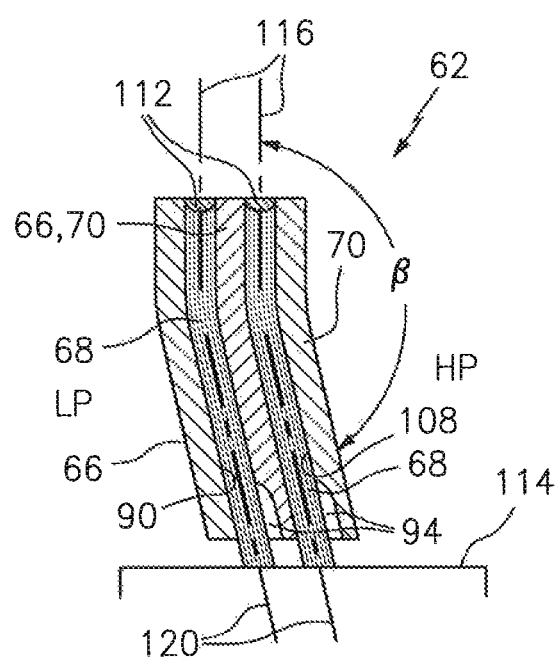
FIG. 10 is a sectioned partial view of a multi-stage brush seal embodiment.

FIG. 10 illustrates an alternative brush seal 62 embodiment. In this embodiment, the first plane 116 and second plane 120 are oriented as described above; e.g., the second plane 120 is skewed from the first plane 116 by an obtuse angle "β". In this embodiment, the brush seal 62 is configured to seal within an application wherein the high pressure region ("HP") and the low pressure region ("LP") are opposite that shown in FIG. 3. In FIG. 3, the high pressure region ("HP") is shown to the left of the brush seal 62, and the low pressure region ("LP") is shown to the right of the brush seal 62. The present disclosure is not limited to applications wherein the high pressure region ("HP") is adjacent the front plate 66, and the low pressure region ("LP") is adjacent the back plate 70. In FIG. 10, for example, the high pressure region ("HP") is shown to the right of the brush seal 62, and the low pressure region ("LP") is shown to the left of the brush seal 62. In this embodiment, the brush seal components (e.g., front plate 66, back plate 70, bristles 68, etc.) are arranged as described above, with the exception that a relief pocket 94 may be disposed in the second BP inner side surface 108, rather than in the second FP inner side surface 90. The brush seal 62 embodiment shown in FIG. 10 is a multi-stage brush seal embodiment. The brush seal configuration shown in FIG. 10 may be utilized with a single stage brush seal 62; e.g., as shown in FIGS. 3 and 9.

Embodiments of the present brush seal 62 may be configured to create a seal between two static structures, or create a seal between a static structure and a dynamic structure; e.g., a rotating structure. The diagrammatic illustration shown in FIG. 3 depicts a brush seal 62 embodiment attached to a static structure 122 and sealing relative to the sealing surface 114 of a rotating structure 124; e.g., an application type that is often used within a gas turbine engine. As indicated above, the brush seal 62 is disposed to seal between a high pressure region ("HP") and a low pressure region ("LP"). The configuration of the present brush seal 62 allows the brush seal 62 to be utilized in a relatively small axial space. For example, the plurality of bristles 68 (which are attached to the base end 82, 100 of the brush seal 62) are constrained and deflected an angle "β" by the front plate 66 and the back plate 70 (see FIG. 9). This configuration is significant in that the bristles 68 extending out from the attachment region (e.g., the weld 112) are constrained and supported not only in the base region (i.e., the first plane 116 region), but also through the arcuate transition region 118, and also in at least a portion of the second plane 120 region. Prior art brush seals of which we are aware having bristles that are deflected, often only support the bristles in the base region adjacent the attachment (e.g., the weld). Hence, the deflected bristles are cantilevered from the base region and can flex about the base region. The bristles in this type of brush seal configuration may be subject to elevated stress concentration at the point of exit from the base region. Embodiments of the present brush seal 62, in contrast, constrain and support the bristles 68 not only in the base region (i.e., the first plane 116 region), but also through the arcuate transition region 118, and also in at least a portion of the second plane 120 region, thereby mitigating any potential stress concentrations within the bristles 68. In those embodiments of the present brush seal 62 wherein the front plate 66 of the brush seal 62 includes a relief pocket 94, some length of the bristle third lengthwise portions 80 adjacent the relief pocket 94 may straighten out (e.g., extend in a more radial direction) in the absence of pressure acting on the bristles 68. However, in these embodiments the bristles 68 remain constrained and supported in the first plane 116 region, through the arcuate transition region 118, and in at least a portion of the second plane 120 region.

During operation of the device in which the brush seal 62 is utilized (e.g., a gas turbine engine), air pressure in the high pressure region (contiguous with the front plate 66 of the brush seal 62) acts on the bristles 68 forcing the bristles 68 to resiliently deflect towards the back plate 70 and low pressure region. As indicated above, in some applications fluids within the operating environment of the brush seal 62 can act on the bristles 68 (i.e., "windage", often present in high speed shaft applications), causing the bristles 68 to deflect out of position and negatively affect the functionality of the brush seal 62. Those embodiments of the present disclosure that include a front plate 66 and a back plate 70 with tip ends 84, 102 disposed at about the same radial position can provide windage protection to the bristles 68, thereby mitigating undesirable bristle 68 deflection. In those brush seal 62 embodiments wherein a relief pocket 94 is disposed in the front plate 66, the front plate 66 still provides windage protection, but also allows additional deflection of the bristles 68.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A multi-plane annular brush seal extending circumferentially about an axial centerline, the brush seal comprising:
    a front plate;
    a back plate; and
    a plurality of bristles attached to the front plate and the back plate at a base end of the brush seal, wherein each bristle has a first lengthwise portion extending from the base end, a second lengthwise portion, and a third lengthwise portion, and the second lengthwise portion of each respective bristle is disposed between the first lengthwise portion and third lengthwise portion of the respective bristle, and each third lengthwise portion terminates in a tip end;
    wherein the front plate and back plate are configured to maintain the bristle first lengthwise portions substantially parallel to a first plane, to maintain the second lengthwise portion of the bristles through a transition region, and to maintain the bristle third lengthwise portions substantially parallel to a second plane;
    wherein the first plane is skewed from the second plane by an obtuse angle; and
    wherein at least some of the bristle second lengthwise portions are maintained in contact with the front plate through the transition region and at least some of the bristle second lengthwise portions are maintained in contact with the back plate through the transition region.

2. The multi-plane annular brush seal of claim 1, wherein the front plate and back plate are configured to maintain the bristle first lengthwise portions substantially parallel to the first plane, to maintain the second lengthwise portion of the bristles through the transition region, and to maintain the bristle third lengthwise portions substantially parallel to the second plane, at any given circumferential position of the brush seal.

3. The multi-plane annular brush seal of claim 2, wherein the transition region is arcuately shaped.

4. The multi-plane annular brush seal of claim 1, wherein the front plate includes a first FP inner side surface disposed adjacent the bristle first lengthwise portions, an FP transition surface disposed adjacent the bristle second lengthwise portions, and a second FP inner side surface disposed adjacent the bristle third lengthwise portions.

5. The multi-plane annular brush seal of claim 4, wherein the first FP inner side surface is skewed from the second FP inner side surface by an angle substantially equal to the obtuse angle.

6. The multi-plane annular brush seal of claim 4, wherein the front plate includes a relief pocket disposed in the second FP inner side surface and is open to an FP tip end.

7. The multi-plane annular brush seal of claim 4, wherein at least some of the bristle first lengthwise portions are in contact with the first FP inner side surface, and at least some of the bristle third lengthwise portions are in contact with the second FP inner side surface.

8. The multi-plane annular brush seal of claim 4, wherein the back plate includes a first BP inner side surface disposed adjacent the bristle first lengthwise portions, a BP transition surface disposed adjacent the bristle second lengthwise portions, and a second BP inner side surface disposed adjacent the bristle third lengthwise portions.

9. The multi-plane annular brush seal of claim 8, wherein the first BP inner side surface is skewed from the second BP inner side surface by an angle substantially equal to the obtuse angle.

10. The multi-plane annular brush seal of claim 8, wherein the first FP inner side surface is substantially parallel to the first BP inner side surface.

11. The multi-plane annular brush seal of claim 8, wherein the second FP inner side surface is substantially parallel to the second BP inner side surface.

12. The multi-plane annular brush seal of claim 8, wherein at least some of the bristle first lengthwise portions are in contact with the first BP inner side surface, and at least some of the bristle third lengthwise portions are in contact with the second BP inner side surface.

13. The multi-plane annular brush seal of claim 1, wherein the bristle third lengthwise portions extend beyond an FP tip end and beyond a BP tip end.

14. The multi-plane annular brush seal of claim 13, wherein the bristle third lengthwise portions extend a first distance beyond the FP tip end, and extend a second distance beyond the BP tip end, wherein the first distance and the second distance are equal.

15. An annular brush seal extending circumferentially about an axial centerline, the brush seal comprising:
a front plate having a FP base end, a FP tip end, a first FP inner side surface, and a second FP inner side surface, wherein the first FP inner side surface extends from the FP base end to the second FP inner side surface, and wherein the first FP inner side surface is planar and extends along a first line, and the second FP inner side surface is planar and extends along a second line, and the first line and the second line are skewed from one another by an included obtuse angle;
a back plate having a BP base end, a BP tip end, a first BP inner side surface, and a second BP inner side surface, wherein the first BP inner side surface extends from the BP base end to the second BP inner side surface;
wherein the first BP inner side surface is substantially parallel the first FP inner side surface, and the second BP inner side surface is substantially parallel the second FP inner side surface; and
a plurality of bristles attached to the front plate and the back plate adjacent the FP base end and the BP base end;
wherein each bristle within the plurality of bristles has a first lengthwise portion extending from a base end, a second lengthwise portion, and a third lengthwise portion, and the second lengthwise portion of each respective bristle is disposed between the first lengthwise portion and third lengthwise portion of the respective bristle, and each third lengthwise portion terminates in a tip end; and
wherein the bristle first lengthwise portions extend substantially parallel to the first FP inner side surface, and the bristle third lengthwise portions extend substantially parallel to the second FP inner side surface.

16. The annular brush seal of claim 15, wherein in the second lengthwise portion of each respective bristle, the bristle arcuately transitions from the first lengthwise portion to the third lengthwise portion.

17. The annular brush seal of claim 16, wherein the front plate includes a relief pocket disposed in the second FP inner side surface and is open to the FP tip end.

18. A gas turbine engine, comprising:
a fan section;
a compressor section;
a combustor section;
a turbine section; and
at least one multi-plane brush seal extending circumferentially about an axial centerline, the brush seal includes:
a front plate;
a back plate; and
a plurality of bristles attached to the front plate and the back plate at a base end of the brush seal, wherein each bristle has a first lengthwise portion extending from the base end, a second lengthwise portion, and a third lengthwise portion, and the second lengthwise portion of each respective bristle is disposed between the first lengthwise portion and third lengthwise portion of the respective bristle, and each third lengthwise portion terminates in a tip end;
wherein the front plate and back plate are configured to maintain the bristle first lengthwise portions substantially parallel to a first plane, to maintain the second lengthwise portion of the bristles through a transition region, and to maintain the bristle third lengthwise portions substantially parallel to a second plane;
wherein the first plane is skewed from the second plane by an obtuse angle; and
wherein at least some of the bristle second lengthwise portions are maintained in contact with the front plate through the transition region and at least some of the bristle second lengthwise portions are maintained in contact with the back plate through the transition region.

* * * * *